Patented Aug. 16, 1949

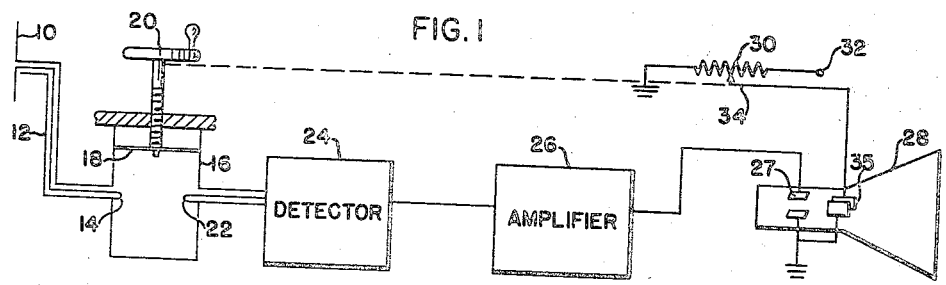
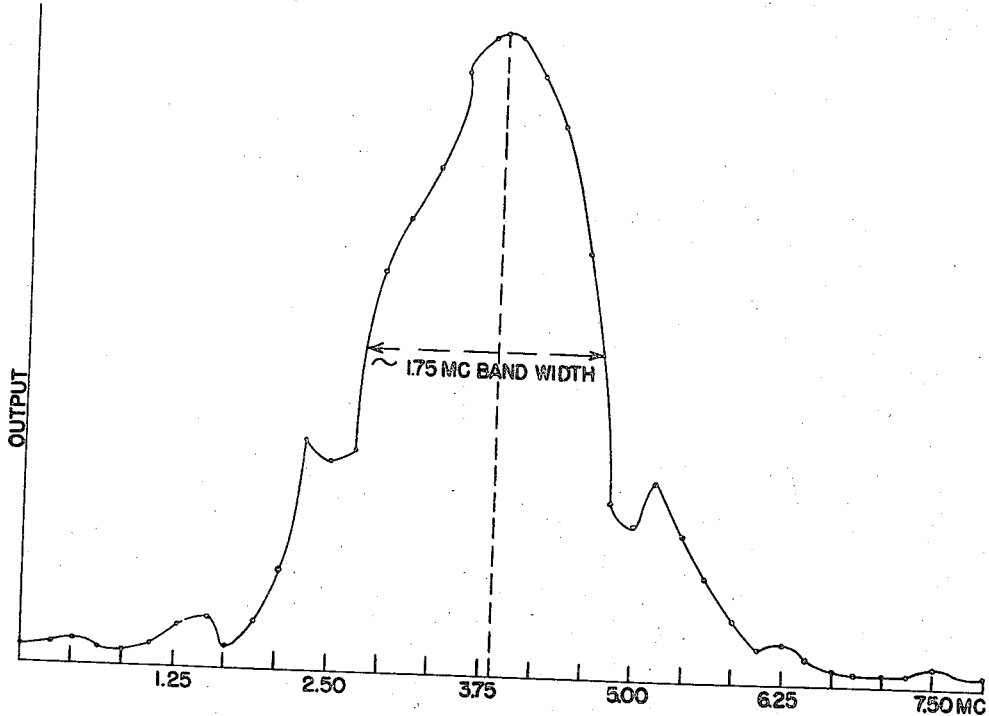

2,479,222

UNITED STATES PATENT OFFICE 2,479,222

ELECTRICAL APPARATUS

George G. Edlen, Los Angeles, Calif., assignor, by mesne assignments, to the United States of America as represented by the Secretary of War Application September 21, 1945, Serial No. 617,872

2 Claims. (Cl. 175—183)

This invention relates in general to electrical apparatus and more particularly to a frequency analyzer for electromagnetic oscillations.

It is frequently desirable to determine experimentally the frequency components of complex electromagnetic oscillations. This may be done through the use of some type of selective circuit or element which will respond substantially to only one frequency at a time. One type of circuit element possessing these selective characteristics to a high degree is a resonant cavity, since it is well known that any closed surface having conducting walls can support an oscillating electromagnetic field within it, and possesses certain resonant frequencies when excited by electromagnetic oscillations. Cavity resonators have the advantages of simplicity, relatively large physical size, high Q, and very high shunt impedance. That type of cavity generally known as non-reentrant is typified in idealized form by the cylinder, prism, sphere, ellipsoid, etc., and possesses in general a very high Q and a resulting high selectivity. Resonant cavities of this type are generally known as echo boxes and may be caused to oscillate in such a mode that the theoretical Q is as high as 55,000. The resonant frequency of an echo box depends on its size and may be adjusted by varying one dimension; for example, by moving one wall of the cavity in and out by means of a screw adjustment.

It is therefore an object of the present invention to provide a frequency analyzing means employing an echo box as a selective circuit element. It is a further object so to adapt this means that the resonant frequency of the echo box may conveniently be varied through a known series of values and the output magnitude of each component of a given complex electromagnetic oscillation may be measured. It is a further object of this invention to provide a visual indication of the frequency and amplitude of the various components of a complex wave.

Other objects, features, and advantages of this invention will suggest themselves to those skilled in the art and will become apparent from the following description of the invention taken in connection with the accompanying drawing in which:

Fig. 1 is a block diagram of a system embodying the principles of the present invention; and Fig. 2 is a sketch of a typical frequency spectrum determined experimentally by use of the present invention.

Reference is made now more particularly to Fig. 1 in which a dipole 10 is connected through a coaxial transmission line 12 and a coupling 14 to an echo box 16. Plate 18, which forms one of the sides of echo box 16, is so mounted that its position may be varied by means of adjusting screw 20, thus varying the size of the internal cavity of the echo box. Coupling loop 22 is used as a means of transmitting electromagnetic energy from echo box 16 to detector 24, which may be a crystal detector or any other type of high frequency detecting means known in the art. The output of detector 24 is applied to direct coupled amplifier 26, and the output of the latter is in turn applied to vertical deflecting plate 27 of cathode ray tube 28, which in the preferred embodiment has a long persistence screen. In the preferred embodiment illustrated in Fig. 1 a potentiometer 30 is supplied with a D.-C. voltage through terminal 32, and variable tap 34 is mechanically connected to adjusting screw 20 in such a way that it is moved from one end to the other of potentiometer 30 in the same time that the position of plate 18 is changed through its entire range. The D.-C. voltage at variable tap 34 is applied to horizontal deflecting plate 35 of cathode ray tube 28.

When the analyzer of Fig. 1 is in operation, the complex wave to be analyzed is received by dipole 10, and if this wave contains a component of the frequency to which echo box 16 is resonant, oscillations will be set up within the echo box, their magnitude being proportional to the amplitude of the given frequency component. Part of the energy of these oscillations is coupled by means of loop 22 to detector 24, the output of which then becomes proportional to the magnitude of the given frequency component. After amplification in amplifier 26, the output of detector 24 is used to deflect vertically the beam in the cathode ray tube 28 by an amount proportional to the magnitude of the given frequency component. As the resonant frequency of echo box 16 is varied over its entire range, the beam of cathode ray tube 28 is moved horizontally across the face of the tube. Thus since the vertical deflection of the beam is continually proportional to the amplitude of the frequency component to which echo box 16 is resonant, a curve will be traced on the screen of the cathode ray tube 28 which is indicative of the frequency spectrum of the complex wave under consideration.

It will be obvious that other indicating means than that shown in Fig. 1 may be used in conjunction with the present invention. For example, the output of amplifier 26 may be applied to deflect the marking element of a recording ammeter, the chart of which is driven by a mechanical connection to adjusting screw 20. In this way a permanent record of a frequency spectrum could be made without the use of photography. This method of indication will result in a portable device which could be used for field testing.

Fig. 2 shows a typical frequency spectrum curve which might be obtained by analyzing the output of a high frequency oscillator. Frequency in megacycles is measured along the horizontal axis, and the amplitudes of the frequency components are measured vertically.

Although the invention has been described with amplitude and frequency being visually indicated along a vertical and horizontal coordinate respectively, it will be understood by those skilled in the art that these coordinates may be reversed.

While there has been described what is at present considered to be the preferred embodiment of this invention, it will be obvious to those skilled in the art that various changes and modifications may be made therein without departing from the scope of the invention as set forth in the appended claims.

The invention claimed is:

1. A frequency analyzer comprising a cavity resonator having a mechanism to vary the resonant frequency thereof, means to receive and couple into said resonator the energy to be analyzed, detecting means, means to introduce the energy from said resonator to said detecting means, means to amplify the output of said detecting means, a cathode ray tube having vertical and horizontal beam reflection plates, means to impress the output of said amplifier means on said vertical deflection plates, a source of direct-current potential connected to said horizontal deflection plates, means to vary the output of said source, said latter means being linked to said tuning mechanism whereby the tuning of the resonator through its frequency range will cause a concurrent horizontal movement of the beam across the face of said tube.

2. In a frequency analyzer circuit comprising a cavity resonator having a mechanism to vary the resonant frequency thereof, and an indicating means comprising a cathode ray tube having vertical and horizontal beam deflection plates, means to cause a horizontal motion of the beam concurrently with the tuning of said resonator, said means comprising a source of direct potential, a potentiometer in series therewith, said potentiometer having a variable tap through which said potential is impressed upon said horizontal deflecting plates, said tap being linked to the tuning mechanism of said resonator whereby the variation of said tuning mechanism will cause a variation in the magnitude of the potential impressed upon said horizontal plates.

GEORGE G. EDLEN.

REFERENCES CITED

The following references are of record in the file of this patent:

UNITED STATES PATENTS

| Number | Name | Date |
|---|---|---|
| 1,994,232 | Schuck, Jr. | Mar. 12, 1935 |
| 2,159,790 | Freystedt et al. | May 23, 1939 |
| 2,380,791 | Rosencrans | July 21, 1945 |
| 2,405,814 | Brannin | Aug. 13, 1946 |